C. H. STINSON.
DIFFERENTIAL TRANSMISSION GEAR.
APPLICATION FILED MAR. 4, 1916.
1,228,713.
Patented June 5, 1917.
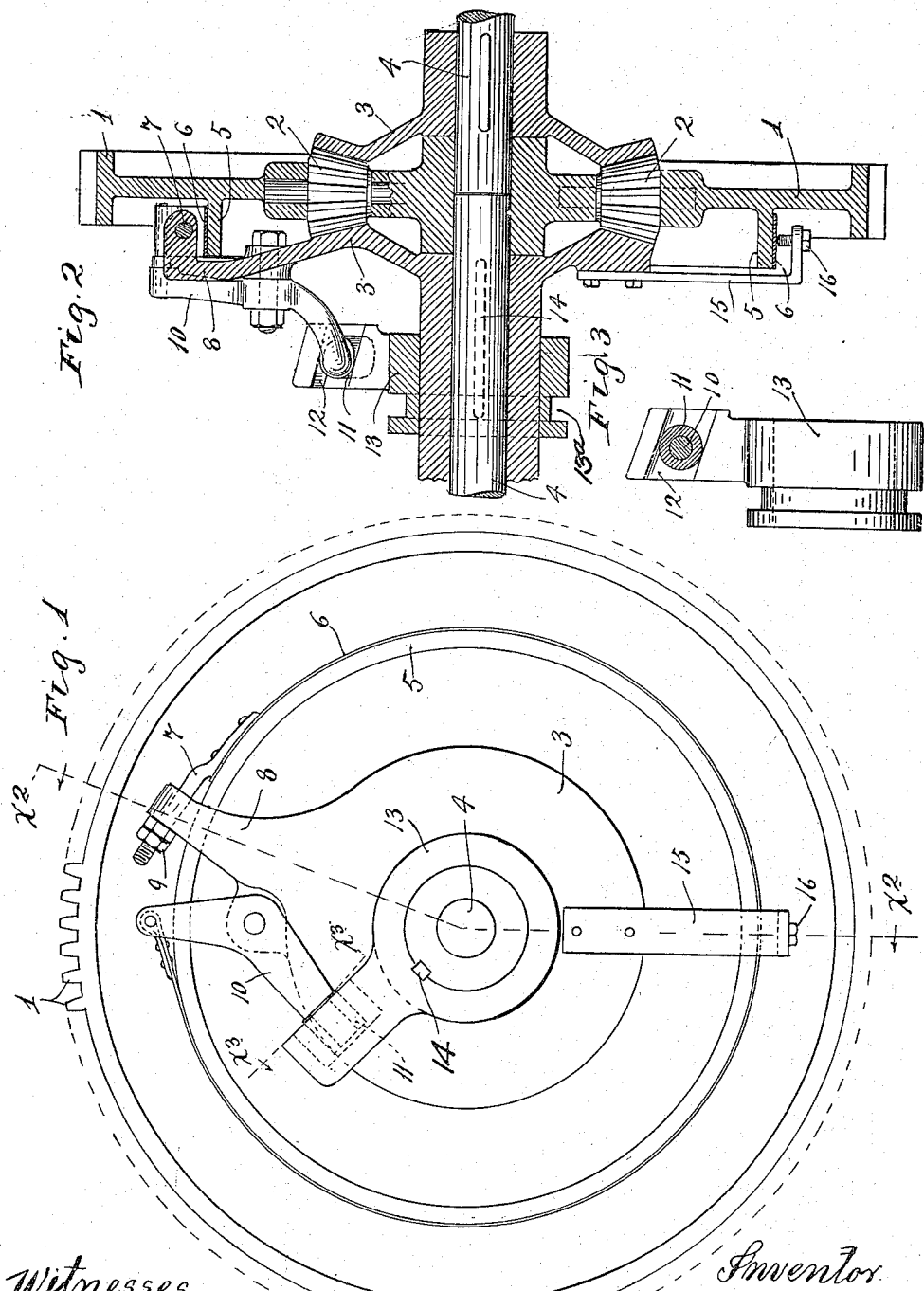

UNITED STATES PATENT OFFICE.

CHARLES H. STINSON, OF WATERTOWN, SOUTH DAKOTA.

DIFFERENTIAL TRANSMISSION-GEAR.

1,228,713. Specification of Letters Patent. Patented June 5, 1917.

Application filed March 4, 1916. Serial No. 82,105.

*To all whom it may concern:*

Be it known that I, CHARLES H. STINSON, a citizen of the United States, residing at Watertown, in the county of Codington and State of South Dakota, have invented certain new and useful Improvements in Differential Transmission-Gears; and I do hereby declare the following to be a full, clear, and exact description of the invention, such as will enable others skilled in the art to which it appertains to make and use the same.

My invention relates to differential transmission gears for automobiles and other tractors, and involves a novel combination therewith of a clutch, whereby the gears of the differential may be locked together, so that both traction gears may then be positive-driven.

The well known function of a differential transmission gear is to permit the two traction wheels to be driven at different speeds in turning corners or traveling curves; and it is a well known fact that the arrangement whereby this desired result is obtained has an inherent defect in that when one of the traction wheels loses its traction, as when on a slippery spot, it will spin at high speed and positive driving force will not be transmitted to the other traction wheel. Such slips of one of the traction wheels often makes it impossible to drive a machine out of a rut or bad spot and are frequently the cause of skidding of the machine, resulting in serious accidents.

My invention provides a clutch whereby the gears of the differential transmission mechanism may be locked together, at will, to thereby cause the driving force to be positively transmitted to both traction wheels.

In the accompanying drawings, which illustrate the invention, like characters indicate like parts throughout the several views.

Referring to the drawings,

Figure 1 is a side elevation illustrating my invention;

Fig. 2 is a section taken on the line $x^2$—$x^2$ of Fig. 1, some parts being shown in full; and Fig. 3 is a detail in section on the line $x^3$—$x^3$ of Fig. 1.

Of the parts of the differential gear mechanism, the numeral 1 indicates the master wheel shown as in the form of a spur gear; the numeral 2 indicates the planetary beveled pinions journaled to and carried by the said master wheel, and the numeral 3 indicates the opposing beveled gears that mesh with the said pinions 2 and are independently keyed, or otherwise rigidly secured to axially alined shafts, or shaft sections 4, on the abutting ends of which the hub of the master wheel 1 is loosely journaled, all in the customary way. Otherwise stated, the said parts 1 to 4, inclusive, are, or may be of the usual construction and arrangement, the operation of which is well known.

For the application of the clutch, the master wheel 1 is provided on one side with a laterally projecting annular brake flange 5, on which works a brake band 6. This brake band 6, at one end, is anchored to the adjacent beveled gear 3, and at its other end is anchored to a brake lever 10, which, in turn, is pivoted to the same gear 3. As shown, this is accomplished by providing the brake band 6 at one end with a threaded bolt 7 which is passed through the perforated outer end of an arm 8 projected outward from the gear 3. Nuts 9 on the threaded end of the bolt 7 serve to adjust the brake band. The brake lever 10 is intermediately pivoted to the base of the said arm 8, and at its outer end, is attached to the other end of the brake band 6. The inner end of the said lever 10 is equipped with a roller 11 that works in an oblique slot 12 formed in the projecting portion of the shipper collar 13 that is mounted to slide upon the extended hub of the gear 3 to which the said lever is pivoted. A key 14 causes the shipper collar 13 to rotate with the said gear 3 but permits it to freely slide thereon. The said collar 13 is provided with an annular groove $13^a$ in which the ring of a shipper lever, not shown, is adapted to work to inpart axial movements to the said collar, and hence, oscillatory movements to the brake lever 10. When the collar 13 is moved toward the left, in respect to Fig. 2, the brake band 6 will be released from the brake flange 5, but when the said collar is moved toward the right, the brake band will be tightly held against the brake flange, and this as is evident, will frictionally lock the master wheel 1 for rotation with the gear 3 to which the brake lever 10 is pivoted.

Obviously, when the wheel 1 is locked, in respect to the said gear, the pinions 2 cannot rotate on their axes, and hence, the other gear 3 cannot rotate in respect to the companion gear 3, or in respect to the said master wheel. Under these conditions, of course, the two shafts 4, and hence the traction wheels, which, in pratice, are connected thereto and driven therefrom, will be positively given common rotation.

Of course, the collar 13 can be given axial movements while the gears 3 are being rotated, and hence, the differential can be locked or released at any time whether set or whether in action. The frictional action of the brake permits the locked connection between the gears to be set gradually so as to relieve the gears from undue strains.

To yieldingly retract the intermediate portion of the brake band 6, the gear 3 to which the brake lever is pivoted, is provided with a radially projecting spring arm or bracket 15, the outer end of which is provided with a stud 16 for holding said brake band in frictional contact with the brake flange 5. The use of a friction clutch for locking the gears of the differential, is of the greatest importance because it permits of a gradual application of the locking force and makes it possible to apply the clutch while the gears are in action. Whereas, with a positive clutch or lock, it would be necessary to always stop the transmission before operating the clutch to interlock the gears. The construction is very simple and at the same time, highly efficient for the purposes had in view.

What I claim is:

1. In a differential gear mechanism, the combination with a master wheel, opposing beveled gears, and an intermediate planetary pinion of a differential gear mechanism, of an annular part of said master wheel having a brake surface, a movable brake element carried by one of said beveled gears and cooperating with the said brake surface of said master wheel, a brake lever pivoted to the same beveled gear and connected to the said movable brake element, and a sliding collar arranged to rotate with said beveled gear to which said lever is pivoted, and operatively connected to the said brake lever.

2. The combination with the master wheel, opposing beveled gears and interposed planetary pinion of a differential gear mechanism, of an annular brake flange on said master wheel, a brake band working on said brake flange and anchored at one end to one of said beveled gears, a brake lever pivoted to the same beveled gear and connected to the other end of said brake band, and a sliding collar arranged to rotate with the said beveled gear to which said brake lever is pivoted, but having a sliding movement in respect thereto, and having a connection with said brake lever for causing the same to set and release the brake band.

3. The combination with the master wheel, opposing beveled gears and interposed planetary pinion of a differential gear mechanism, of an annular brake flange on said master wheel, a brake band working on said brake flange and anchored at one end to one of said beveled gears, a brake lever intermediately pivoted to the said same beveled gear and connected at its outer end to the other end of said brake band, and a sliding collar arranged to rotate with the said beveled gear to which said brake lever is pivoted, but having a sliding movement in respect thereto, said sleeve having an outstanding portion formed with an oblique slot operating on the inner end of said brake lever to cause the same to set and release the brake band.

In testimony whereof I affix my signature in presence of two witnesses.

CHARLES H. STINSON.

Witnesses:
BERNICE G. WHEELER,
F. D. MERCHANT.

Copies of this patent may be obtained for five cents each, by addressing the "Commissioner of Patents, Washington, D. C."